United States Patent

[11] 3,532,157

| [72] | Inventor | William S. Hubble |
| | | Cape Elizabeth, Maine |
| [21] | Appl. No. | 788,829 |
| [22] | Filed | Jan. 3, 1969 |
| [45] | Patented | Oct. 6, 1970 |
| [73] | Assignee | General Motors Corporation |
| | | Detroit, Michigan |
| | | a corporation of Delaware |

[54] REGENERATOR DISK
12 Claims, 5 Drawing Figs.

[52] U.S. Cl. ........................................ 165/8, 165/10
[51] Int. Cl. ....................................... F28d 19/04
[50] Field of Search ........................... 165/8, 9, 10

[56] References Cited
UNITED STATES PATENTS

| 3,183,963 | 5/1965 | Mondt | 165/10 |
| 3,369,592 | 2/1968 | Dedow | 165/10 |

FOREIGN PATENTS

| 717,601 | 10/1954 | Great Britain | 165/10 |
| 899,773 | 6/1962 | Great Britain | 165/10 |

Primary Examiner—Robert A. O'Leary
Assistant Examiner—Albert W. Davis
Attorneys—Paul Fitzpatrick and E.W. Christen ABSTRACT: A matrix disk for a rotary regenerator includes a radially outer portion yieldable to a certain extent to prevent overstressing and failure resulting from differential thermal expansion. This portion is made up of deeply corrugated layers alternating with layers which are provided either with very shallow corrugations or with weakening structure such as transverse slots so that these layers can yield circumferentially of the matrix.

Patented Oct. 6, 1970
3,532,157
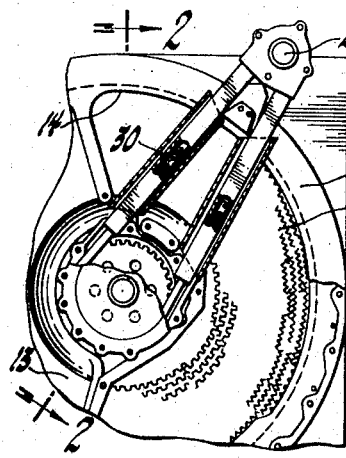
Fig.1
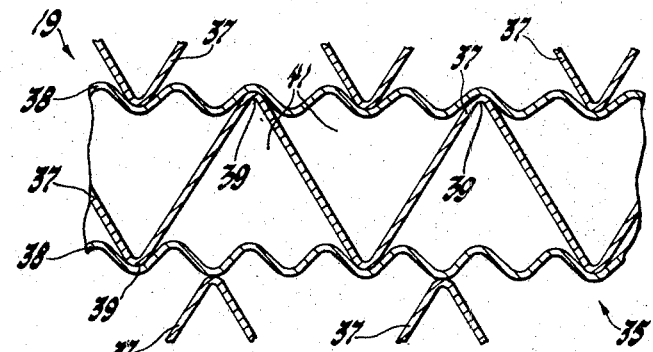
Fig.3
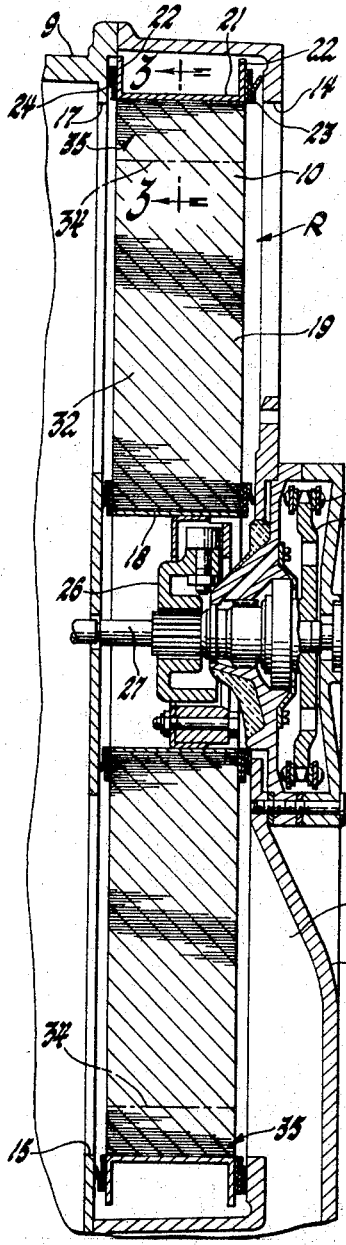
Fig.2
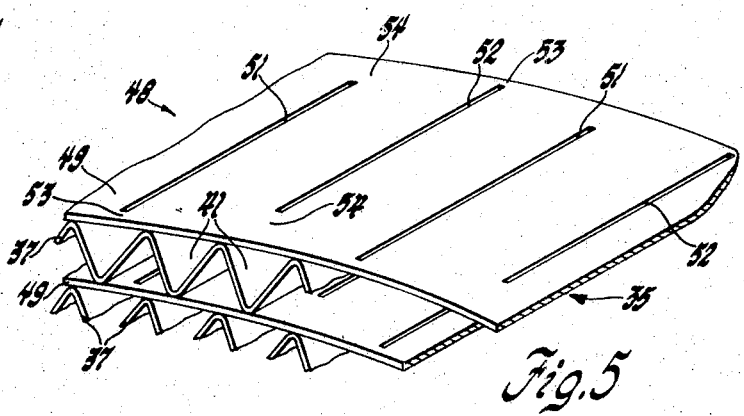
Fig.4
Fig.5
INVENTOR.
William S. Hubble
BY
Paul Fitzpatrick
ATTORNEY

REGENERATOR DISK

SPECIFICATION

My invention is directed to rotary regenerators and is particularly suited to regenerators of the axial-flow or disk type such as that described in copending application Ser. No. 661,075 for Rotary Regenerator Matrix Mount and Drive, filed August 16, 1967, now U.S. Pat. No. 3,476,173, of common ownership with this application.

As is well known, regenerators typically are devices in which a heat transfer mass such as a disk or drum of metal or ceramic rotates through two gas passages so that a hot gas flows through each part of the matrix during one part of the rotation and a cooler gas flows through it during the other part of the rotation. The matrix takes heat from the hot gas and delivers it to the cool gas.

Metal matrices ordinarily are made up of crimped or corrugated metal sheets spirally wound into a disk and then brazed so as to provide a rigid cellular or porous structure. In regenerators of the sort to which my invention is particularly applicable, the major portion of the disk is heated to relatively high temperatures of the order of 1000°F., whereas the rim or radially outermost portion of the disk is contacted around the perimeter by the relatively cool air and thus is at substantially lower temperature. Other factors may cause temperature gradients but, in general, whatever the reasons for the difference in temperature between different radial zones of the matrix, the result is differential expansion with attendant overstressing and yielding of the parts and resulting cracking. Thus, substantial separation in a generally radial plane has been observed in operation of metallic rotary regenerator matrices.

Conventional structure of such an axial-flow regenerator matrix involves alternating flat and corrugated strips which are spirally wound to form the matrix. One example of such structure is illustrated in Whitfield U.S. Pat. No. 3,276,515 for Gas Turbine Regenerator, October 4, 1966. In a structure of this sort, the matrix is quite rigid once the strips are brazed together. Although the corrugated strip can give, the flat strip between the layers of corrugated strip is substantially unyielding. Thus, when the interior of the matrix becomes hotter than the outer zone, high hoop stresses are set up in the flat strips of the outer part of the matrix.

According to my invention, in the matrix or the portion of the matrix in which it is desired to eliminate or minimize such hoop stresses and attendant failures, the circumferentially unyielding flat strip is eliminated and instead there is provided a strip which is such as to be capable of yielding or stretching so that high hoop stresses cannot be developed.

The problem of providing such a structure is complicated by two facts: One is that there must be such mating between the adjacent strips wound into the matrix that flow of gas circumferentially of the matrix is prevented, since such flow would result in leakage from the higher pressure to the lower pressure of gases flowing through the regenerator. The other complicating factor is that, since the matrix is wound spirally each course is of different length than the one before. With a flat strip alternating between the turns of corrugated strip, the increase in circumference of each turn or layer presents no problem. However, if two corrugated strips are employed, there will naturally be more corrugations in each turn than in the one immediately inside it, so that the corrugations will not match uniformly and the successive layers of the matrix will not stack in a proper spiral path. To put it in different terms, at some points the peaks of the corrugations of the sheets will be aligned to provide a large separation where at its other points the peaks of one sheet will fall into the valleys of the other so that the separation is insufficient and, of course, the winding is not close to a uniform spiral.

According to my invention, a strip retaining the advantages of the customary flat strip, but circumferentially yieldable, is substituted for it.

The principal objects of my invention are to provide improved rotary regenerators, to provide an improved matrix disk for rotary regenerators, and to provide a matrix disk of metal structure which is substantially free from destructive stresses resulting from differential thermal expansions within the matrix.

A further object is to provide a superior and durable matrix which is readily fabricated.

The nature of my invention and the advantages thereof will be clear to those skilled in the art from the succeeding detailed description of preferred embodiments of the invention and the accompanying drawings thereof.

FIG. 1 is a small scale drawing illustrating a regenerator installation for a gas turbine engine, with parts cut away.

FIG. 2 is a larger scale sectional view taken on the plane indicated by the line 2–2 in FIG. 1.

FIG. 3 is a greatly enlarged sectional view of the radially outer portion of the matrix taken on the plane indicated by the line 3–3 in FIG. 2.

FIG. 4 is an axonometric view illustrating a structure corresponding to FIG. 3.

FIG. 5 is an axonometric view of a further embodiment of the invention.

Referring first to FIG. 1, a gas turbine engine E may include an engine block or housing 9 which supports the rotating parts and combustion chamber of a gas turbine engine (not illustrated) and which also supports a rotary regenerator R including an axial-flow matrix 10. The matrix is mounted for rotation about a horizontal axis, as illustrated, at a side face of the block 9. Referring also to FIG. 2, the matrix 10 is partially enclosed by a regenerator cover 11 which defines a cool air inlet 13 and an exhaust outlet 14. The block 9 defines a hot air outlet 15 opposite the inlet 13 and a hot gas inlet 17. The matrix illustrated in FIGS. 1 and 2 is an annular disk of metallic structure including a hub or inner ring 18 and a body of heat exchange material 19 made up of metal strips wound to form a disk having parallel faces and pervious to flow parallel to the axis of the disk. The disk also includes an outer ring or rim 21 which may include flanges 22 to cooperate with fixed seals.

The fixed seals, as illustrated in FIG. 2, comprise a main seal 23 on the outer or inlet and exhaust side and a main seal 24 on the inner or block side of the disk. These seals are indicated only schematically on the drawings, since the details of the seals are not material to the present invention. The seals may be of the nature of those described in U.S. Pat. No. 3,368,611, February 13, 1968, of Bracken and Zeek. The seal 24 defines two annular portions cooperating respectively with the inner and outer margins of the matrix disk and a cross arm extending radially of the matrix face between the hot air outlet and the hot gas inlet. As illustrated in FIG. 2, the main seal 23 extends only around the exhaust outlet 14 so that the outer rim 21 of the matrix and the space within the inner ring 18 are exposed to the cool air flowing to the regenerator through inlet 13. The main seals 23 and 24 are of a structure which allows them to float to a limited extent axially of the matrix and to bear lightly against the face of the matrix, notwithstanding distortion of the matrix or case. Any seal structure having such characteristics is satisfactory for use with this invention and, therefore, the details of such a seal will not be described.

The inner rim 18 of the matrix is coupled through a flexible coupling arrangement 26 to a driving shaft 27 suitably mounted in the cover 11. The matrix is slowly rotated by a shaft 29 driven by the gas turbine which is coupled through a sprocket and chain drive 30 to a sprocket 31 fixed on shaft 27. Details of the coupling 26 are described in the above-mentioned prior application and need not be repeated here.

The matrix heat exchange body 19 in which my invention is embodied, comprises two separate radial zones, an inner zone 32 extending from the hub 18 to a dividing cylindrical surface or boundary 34 indicated by broken lines in FIG. 2 and an outer zone 35 radially outward of the boundary 34. The specific structure of the matrix zone 32 is not material to my invention and may follow prior art practices. In the preferred structure as embodied in a matrix about 2 feet in diameter and about 3 inches thick, the inner zone is made up of alternating strips, one being a flat plane strip approximately 0.002 inch thick and the other being a strip of the same thickness with deep narrow corrugations, preferably corrugations approximately 0.03 inch wide and 0.13 inch deep. As used herein, the term "depth" refers to the radial dimension of the corrugations transverse to the general plane of the strip and the term "width" refers to the distance from the center of one peak of the corrugation to the center of the next adjacent peak in the direction circumferentially of the matrix. This structure is wrapped spirally around the hub to the boundary 34 at which point the depth of the corrugations of the corrugated sheet gradually decrease during one circumference of the matrix to blend into the lesser depth of the corrugations in the outer zone 35.

In the preferred form of the invention, the strips in the outer zone comprise alternating turns of a first strip 37 having relatively large corrugations trending axially of the matrix and a second strip 38 having relatively small corrugations trending axially of the matrix. The direction of the corrugations is the same on both strips. However, as will be apparent from FIG. 3 illustrating the preferred embodiment greatly enlarged, the corrugations of the first strip have three times the width and about six times the depth of the corrugations of the second strip. In the particular preferred example, corrugations of the first strip are approximately 0.078 inch wide and 0.060 inch deep and the corrugations of the second strip are approximately 0.026 inch wide and .010 inch deep. In this case, both strips are of stainless steel sheet 0.002 inch thick.

In both zones of the matrix, the deeply corrugated strip can readily be stretched radially of the matrix by a slight flexure widening the spacing or width of the corrugations. However, a flat plane strip has very high resistance to stretching. By contrast, the relatively shallow corrugations in the second strip 38 as illustrated in FIGS. 3 and 4, have the same capacity to yield circumferentially by slight broadening and flattening of the corrugations.

In FIG. 3, it will be seen that the peaks 39 of the corrugations of the first strip 37 engage at about every third corrugation of the strip 38. They may engage so that the peaks 39 engage in the valleys of the adjacent strip 38 or they may engage peak to peak as indicated in the lower part of FIG. 3. Due to the relatively small depth of the corrugations of the strip 38, this makes no troublesome difference in the radial spacing of adjacent second strips 38. As previously stated, because of the spiral winding, the distances around the matrix vary from turn to turn and, therefore, the mating of the peaks and valleys of the corrugated strips will vary from point to point around or radially of the matrix. However, it should be noted that since the corrugations of both the strips 37 and the strips 38 are parallel, there will be a line contact between these two all the way across the width of the matrix disk so that, when these are brazed together, a structure will be made which does not allow fluid flow circumferentially of the matrix but only axially of the matrix through the passages 41 defined between the two strips. In the final turn or course of the sheet metal strips in the outer zone 17, the depth of the corrugations in the strip 37 gradually decrease to maintain a cylindrical outer surface of the heat exchange body adapted to fit into the cylindrical rim 21.

FIG. 5 illustrates a second approach to the problem of making the sheet which does not have the deep corrugations yieldable circumferentially of the matrix so as to prevent build up of undesirable hoop stress. FIG. 5 represents an alternative structure 48 of the outer zone 35 of the matrix in which the first sheet 37 may be just as previously described but in which the second sheet 49 which serves to space the sheets 37 is a flat strip with no corrugations. In this case, the ability of the second strip 49 to yield is created by providing a number of relatively closely spaced weakness lines extending transversely of the matrix parallel to the corrugations of the strip 37. Preferably, the weakening lines, as indicated, are provided by alternating slits 51 and 52 extending most of the way across the width of the strip 49. The two sets of slits are slightly staggered, with slits 51 approaching closer to the near edge of the strip 49 as indicated by the relatively narrow connecting portion 53, a wider connecting portion 54 being left at the far edge of the strip. In the case of the slit 52, the wide connecting portion 54 is at the near edge of the strip and the narrow connecting portion 53 is at the far edge. With this structure, strip 49 retains sufficient continuity to be readily handled and to be brazed to the adjoining strips 37. However, it is weak in the circumferential direction and, if sufficient stress builds up due to differential temperatures in the operation of the matrix, a connecting portion such as 53 may break without further fracture or damage to the matrix. With an occasional break in the portion 53, the strip 49 assumes a somewhat zigzag configuration and by slight separation of the breaks at the bridges 53 can readily be stretched. It should be noted that the two adjacent slits 51 or 52 should be spaced a distance greater than the width of the corrugations in the strip 37, since otherwise a leakage path for flow of gas circumferentially of the matrix can be developed through slits 51 and 52. The slits 51 and 52 are narrow enough so that they cannot interfere with the brazing process and, if a peak of the strip 37 coincides with the slit, the brazing can take place without any difficulty. This particular expansion joint, however, may be put out of action by the brazing to the strip 37.

The weakening could be provided by grooves extending across the strip 49 but not entirely through it if desired. However, the form shown is believed to be superior.

The detailed description of the preferred embodiment of the invention for the purpose of explaining the principles thereof is not to be considered as limiting or restricting the invention, as many modifications may be made by the exercise of skill in the art.

I claim:

1. A rotary regenerator matrix structure of annular form porous to flow of fluid generally parallel to the axis of the matrix and effective to block fluid flow circumferentially around the axis, the matrix structure comprising first and second spiral-wound strips with each turn of the first strip disposed between adjacent turns of the second strip and with the strips abutting face-to-face and fixed together into a rigid elastic structure, the first strip being formed with corrugations trending generally axially of the matrix and with substantial depth radially of the matrix to separate radially the turns of the second strip and define fluid flow passages through the said corrugations, the second strip being at least substantially flat so as to engage the peaks of the first strip to block circumferential flow and maintain approximately constant spacing between adjacent turns of the second strip, the second strip having formations making said second strip longitudinally extensible so as to be stretchable circumferentially of the matrix to a sufficient extent to minimize stresses due to thermal expansion and contraction in the matrix structure.

2. A structure as defined in claim 1 in which the second strip is formed with corrugations parallel to those of the first strip and of relatively small depth compared to those of the first strip.

3. A structure as defined in claim 2 in which the corrugations of the second strip are from one-eighth to one-fourth of the depth of those of the first strip.

4. A structure as defined in claim 2 in which the corrugations of the first strip are several times wider than those of the second strip.

5. A structure as defined in claim 1 in which the second strip is formed with weakness lines extending across the strip at a spacing greater than the width of the corrugations of the first strip.

6. A structure as defined in claim 5 in which some weakness lines approach nearer one edge of the strip and others approach nearer the other edge of the strip.

7. A rotary regenerator matrix structure of annular form porous to flow of fluid generally parallel to the axis of the matrix and effective to block fluid flow circumferentially around the axis, the matrix structure comprising first and second spiral-wound strips with each turn of the first strip disposed between adjacent turns of the second strip and with the strips abutting face-to-face and fixed together into a rigid elastic structure, the first strip being formed with relatively wide and deep corrugations trending generally axially of the matrix to separate radially the turns of the second strip and define fluid flow passages through the said corrugations, the second strip being formed with relatively narrow and shallow corrugations trending parallel to the corrugations in the first strip so as to engage the peaks of the first strip to block circumferential flow and maintain approximately constant spacing between adjacent turns of the second strip, the second strip being longitudinally extensible so as to be stretchable circumferentially of the matrix to a sufficient extent to minimize stresses due to thermal expansion and contraction in the matrix structure.

8. A structure as defined in claim 7 in which the corrugations of the second strip are from one-eighth to one-fourth of the depth of those of the first strip.

9. A rotary regenerator matrix structure of annular form porous to flow of fluid generally parallel to the axis of the matrix and effective to block fluid flow circumferentially around the axis, the matrix structure comprising first and second spiral-wound strips with each turn of the first strip disposed between adjacent turns of the second strip and with the strips abutting face-to-face and fixed together into a rigid elastic structure, the first strip being formed with corrugations trending generally axially of the matrix and with substantial depth radially of the matrix to separate radially the turns of the second strip and define fluid flow passages through the said corrugations, the second strip being at least substantially flat so as to engage the peaks of the first strip to block circumferential flow and maintain substantially constant spacing between adjacent turns of the second strip, the second strip having weakness lines extending across the strip at spacing greater than the width of the said corrugations so as to be extensible circumferentially of the matrix to a sufficient extent to minimize stresses due to thermal expansion and contraction in the matrix structure.

10. A structure as defined in claim 9 in which the weakness lines are defined by slits extending only partially across the strip.

11. A structure as defined in claim 9 in which some weakness lines approach nearer one edge of the strip and others approach nearer the other edge of the strip.

12. A structure as defined in claim 11 in which the weakness lines are defined by slits extending only partially across the strip.